(12) United States Patent
Connell, II et al.

(10) Patent No.: US 11,468,751 B2
(45) Date of Patent: Oct. 11, 2022

(54) GUNSHOT DETECTION SYSTEM WITH FIRE ALARM SYSTEM INTEGRATION

(71) Applicant: Johnson Controls Fire Protection LP, Boca Raton, FL (US)

(72) Inventors: Thomas Wysong Connell, II, Westminster, MA (US); Alan Levin, III, Bolton, MA (US); Michael A. Furtado, Shrewsbury, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/968,940

(22) PCT Filed: Feb. 14, 2019

(86) PCT No.: PCT/IB2019/051208
§ 371 (c)(1),
(2) Date: Aug. 11, 2020

(87) PCT Pub. No.: WO2019/159104
PCT Pub. Date: Aug. 22, 2019

(65) Prior Publication Data
US 2021/0049882 A1 Feb. 18, 2021

Related U.S. Application Data

(60) Provisional application No. 62/637,161, filed on Mar. 1, 2018, provisional application No. 62/631,296, filed on Feb. 15, 2018.

(51) Int. Cl.
*G08B 13/16* (2006.01)
*G08B 25/10* (2006.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 17/00; G08B 25/10; G08B 19/00; G08B 29/24; G06F 16/61; G06Q 50/265
(Continued)

(56) References Cited

U.S. PATENT DOCUMENTS

| 4,709,330 A | 11/1987 | Yokoi et al. |
| 5,504,717 A | 4/1996 | Sharkey et al. |

(Continued)

FOREIGN PATENT DOCUMENTS

| CN | 102 843 205 B | 12/2012 |
| EP | 1 806 952 A2 | 7/2007 |

(Continued)

OTHER PUBLICATIONS

International Preliminary Report on Patentability dated Aug. 27, 2020 from International Application No. PCT/IB2019/051202, filed on Feb. 14, 2019. 14 pages. (WO1).

(Continued)

*Primary Examiner* — John A Tweel, Jr.
(74) *Attorney, Agent, or Firm* — HoustonHogle LLP

(57) ABSTRACT

A gunshot detection system takes advantage of existing fire alarm system infrastructure by tapping a fire alarm communication network for a fire alarm system. Gunshot sensor units and/or a gunshot detection control panel receive power from the fire alarm communication network via tap units and/or tap wires, which provide electrical connectivity between the fire alarm communication network and the devices of the gunshot detection system. At the same time, the gunshot detection devices communicate via wireless (Continued)

links to an ancillary high-speed network. The gunshot sensor units can communicate with the fire alarm control panel via the fire alarm communication network. Even more comprehensive integration with the fire alarm system involves a hybrid gunshot detection and fire alarm control panel for controlling devices of both the gunshot detection system and the fire alarm system. Hybrid gunshot sensor units include fire detection elements such as smoke sensors and/or fire notification elements.

15 Claims, 8 Drawing Sheets

(51) Int. Cl.

| | | |
|---|---|---|
| G08B 17/00 | (2006.01) | |
| G08B 17/06 | (2006.01) | |
| G08B 25/14 | (2006.01) | |
| H04L 41/06 | (2022.01) | |
| G08B 29/18 | (2006.01) | |
| G08B 29/24 | (2006.01) | |
| G06F 16/61 | (2019.01) | |
| H04W 12/037 | (2021.01) | |
| G06F 21/60 | (2013.01) | |
| G06Q 50/26 | (2012.01) | |
| H04L 9/08 | (2006.01) | |
| H04L 9/14 | (2006.01) | |
| H04W 56/00 | (2009.01) | |
| G08B 19/00 | (2006.01) | |
| G08B 25/04 | (2006.01) | |
| G07C 9/00 | (2020.01) | |
| G08B 7/06 | (2006.01) | |
| G08B 25/01 | (2006.01) | |
| H04W 4/029 | (2018.01) | |
| H04W 4/38 | (2018.01) | |
| H04W 4/90 | (2018.01) | |
| H04W 84/18 | (2009.01) | |
| H04W 84/20 | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(58) Field of Classification Search
USPC ...................................................... 340/686.1
See application file for complete search history.

(56) References Cited

U.S. PATENT DOCUMENTS

| | | | |
|---|---|---|---|
| 5,973,998 A | 10/1999 | Showen et al. | |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 | 8/2008 | Calhoun | |
| 7,460,006 B2 | 12/2008 | Kates | |
| 7,676,194 B2* | 3/2010 | Rappaport | H04B 7/15542 455/11.1 |
| 7,843,356 B2 | 11/2010 | Webb | |
| 7,986,231 B1 | 7/2011 | Bentley et al. | |
| 8,149,649 B1 | 4/2012 | Brinn et al. | |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2* | 6/2017 | Lax | G08B 5/38 |
| 9,672,727 B1 | 6/2017 | Alexander et al. | |
| 9,679,459 B2 | 6/2017 | Crowe | |
| 9,830,932 B1 | 11/2017 | Gunderson et al. | |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1 | 5/2020 | Fowler et al. | |
| 10,741,058 B1 | 8/2020 | Miller | |
| 10,928,244 B2 | 2/2021 | Warren et al. | |
| 11,133,021 B2 | 9/2021 | Davis et al. | |
| 11,170,619 B2 | 11/2021 | Connell, II et al. | |
| 11,282,536 B2 | 3/2022 | Davis et al. | |
| 2006/0109113 A1 | 5/2006 | Reyes et al. | |
| 2008/0165621 A1 | 7/2008 | Fisher et al. | |
| 2009/0222241 A1 | 9/2009 | Dorogi et al. | |
| 2010/0142715 A1 | 6/2010 | Goldstein et al. | |
| 2010/0271905 A1 | 10/2010 | Khan et al. | |
| 2010/0305778 A1 | 12/2010 | Dorneich et al. | |
| 2011/0169633 A1 | 7/2011 | Lauder et al. | |
| 2014/0218518 A1 | 8/2014 | Oliver | |
| 2014/0222943 A1 | 8/2014 | Oleson et al. | |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1 | 3/2015 | Apelbaum et al. | |
| 2015/0339913 A1 | 11/2015 | Lyman et al. | |
| 2015/0347079 A1 | 12/2015 | Price et al. | |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0019264 A1 | 1/2017 | Nugent et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1 | 6/2018 | Patel et al. | |
| 2018/0199179 A1 | 7/2018 | Rauner | |
| 2018/0308475 A1 | 10/2018 | Locke et al. | |
| 2019/0024918 A1 | 1/2019 | Brissette et al. | |
| 2019/0130723 A1 | 5/2019 | Thiel et al. | |
| 2019/0213901 A1 | 7/2019 | Kur et al. | |
| 2019/0347920 A1 | 11/2019 | Anderson et al. | |
| 2021/0158837 A1 | 5/2021 | Saki et al. | |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |

(56) References Cited

FOREIGN PATENT DOCUMENTS

| WO | WO 2019159100 | 8/2019 |
|---|---|---|
| WO | WO 2019159101 | 8/2019 |
| WO | WO 2019159102 | 8/2019 |
| WO | WO 2019159103 | 8/2019 |
| WO | WO 2019159105 | 8/2019 |
| WO | WO 2019159106 | 8/2019 |

OTHER PUBLICATIONS

International Preliminary Report on Patentability dated Aug. 27, 2020, from International Application No. PCT/IB2019/051203, filed on Feb. 14, 2019. 7 pages. (WO2).
International Preliminary Report on Patentability dated Aug. 27, 2020, from International Application No. PCT/IB2019/051204, filed on Feb. 14, 2019. 9 pages. (WO3).
International Preliminary Report on Patentability dated Aug. 27, 2020, from International Application No. PCT/IB2019/051205, filed on Feb. 14, 2019. 23 pages. (WO4).
International Preliminary Report on Patentability dated Aug. 27, 2020, from International Application No. PCT/IB2019/051206, filed on Feb. 14, 2019. 8 pages. (WO5).
International Preliminary Report on Patentability dated Aug. 27, 2020, from International Application No. PCT/IB2019/051207, filed on Feb. 14, 2019. 8 pages. (WO6).
International Preliminary Report on Patentability dated Aug. 27, 2020, from International Application No. PCT/IB2019/051208, filed on Feb. 14, 2019. 12 pages. (WO7).
International Preliminary Report on Patentability dated Aug. 27, 2020, from International Application No. PCT/IB2019/051209, filed on Feb. 14, 2019. 12 pages. (WO8).
International Preliminary Report on Patentability dated Aug. 27, 2020, from International Application No. PCT/IB2019/051210, filed on Feb. 14, 2019. 9 pages. (WO9).
International Search Report and Written Opinion of the International Searching Authority, dated Jun. 18, 2019, from International Application No. PCT/IB2019/051202, filed on Feb. 14, 2019. 24 pages. (WO1).
International Search Report and Written Opinion of the International Searching Authority, dated May 21, 2019, from International Application No. PCT/IB2019/051203, filed on Feb. 14, 2019. 13 pages. (WO2).
International Search Report and Written Opinion of the International Searching Authority, dated May 14, 2019, from International Application No. PCT/IB2019/051204, filed on Feb. 14, 2019. 15 pages. (WO3).
International Search Report and Written Opinion of the International Searching Authority, dated Jul. 12, 2019, from International Application No. PCT/IB2019/051205, filed on Feb. 14, 2019. 23 pages. (WO4).
International Search Report and Written Opinion of the International Searching Authority, dated Jun. 12, 2019, from International Application No. PCT/IB2019/051206, filed on Feb. 14, 2019. 13 pages. (WO5).
International Search Report and Written Opinion of the International Searching Authority, dated Jun. 14, 2019, from International Application No. PCT/IB2019/051207, filed on Feb. 14, 2019. 13 pages. (WO6).
International Search Report and Written Opinion of the International Searching Authority, dated May 31, 2019, from International Application No. PCT/IB2019/051208, filed on Feb. 14, 2019. 18 pages. (WO7).
International Search Report and Written Opinion of the International Searching Authority, dated Jul. 23, 2019, from International Application No. PCT/IB2019/051209, filed on Feb. 14, 2019. 20 pages. (WO8).
International Search Report and Written Opinion of the International Searching Authority, dated May 24, 2019, from International Application No. PCT/IB2019/051210, filed on Feb. 14, 2019. 15 pages. (WO9).
Partial Search Report dated Apr. 24, 2019, from International Application No. PCT/IB2019/051202, filed on Feb. 14, 2019. 14 pages. (WO1).
Partial Search Report dated May 17, 2019, from International Application No. PCT/IB2019/051205, filed on Feb. 14, 2019. 13 pages. (WO4).
Partial Search Report dated May 31, 2019, from International Application No. PCT/IB2019/051209, filed on Feb. 14, 2019. 12 pages. (WO8).

* cited by examiner

GUNSHOT DETECTION SYSTEM WITH FIRE ALARM SYSTEM INTEGRATION

RELATED APPLICATIONS

This application is a § 371 National Phase Application of International Application No. PCT/IB2019/051208, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection systems that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

At the same time, many premises with gunshot detection systems are also equipped with one or more fire alarm systems. In general, these building management systems are installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

The fire alarm control panels and fire alarm distributed devices typically communicate via two- or three-wire addressable serial networks with one or more signaling line circuits enabling digital communication between the fire alarm control panel and the fire alarm devices. These networks often provide power to the devices with direct current (DC) superimposed upon data transmitted between the devices and other nodes on the network.

SUMMARY OF THE INVENTION

It would be beneficial to enhance the capabilities of existing gunshot detection systems by providing integration between the gunshot detection systems and fire alarm systems, which might be installed in the same building as the gunshot detection systems.

In one example, the gunshot detection system could take advantage of existing fire alarm system infrastructure by tapping into a fire alarm communication network. Tap units could provide electrical connectivity between the fire alarm communication network and devices of the gunshot detection system such as gunshot sensor units and/or a control panel. The devices of the gunshot detection system could then receive power and/or other required services via the fire alarm communication network while possibly communicating via a separate wireless or wired communication path more suited for exchanging larger amounts of data such as audio data generated by the gunshot sensor units. In this way, only power or other fundamental services would be provided to the gunshot detection system, while the fire alarm system is otherwise un-changed.

The gunshot detection system has a more comprehensive integration with the fire alarm system. The gunshot sensor units might communicate with the fire alarm control panel via the fire alarm communication network. A hybrid gunshot detection and fire alarm control panel could control the distributed devices of both the gunshot detection system and the fire alarm system, for example, with the same panel receiving gunshot event data from the gunshot sensor units and fire alarm signals from fire detection devices. Hybrid gunshot sensor units could even include fire detection elements such as smoke sensors and/or fire alarm notification elements.

In general, according to one aspect, the invention features a system for detecting gunshots within a premises, which includes a fire alarm system with a fire alarm communication network. The system comprises gunshot sensor units and tap units. The gunshot sensor units detect the gunshots. The tap units provide electrical connectivity between the fire alarm communication network and the gunshot sensor units, enabling power the gunshot sensor units to receive power from the fire alarm communication network.

In embodiments, the system comprises a gunshot detection control panel, which might also receive power from the fire alarm communication network via one of the tap units. The fire alarm communication network might be an addressable serial network comprising one or more signaling line circuits providing transmission rates of at most one megabits per second (Mbps), suitable for enabling fire detection devices of the fire alarm system to send alarm signals to a control panel of the fire alarm system, or for the fire alarm control panel to send instructions to fire notification devices, for example. However, the gunshot detection control panel could receive event data (e.g. including audio data generated via microphones of the gunshot sensor units) and otherwise communicate with the gunshot sensor units via a wired and/or wireless enterprise network, which, for example, might be an internet-protocol-based private network, local area network for the premises and/or public network providing data transmission rates of at least 10 megabits per second. The gunshot detection control panel and/or the gunshot sensor units might include wireless network interfaces for connecting to the enterprise network. In this way, the gun shot detection system can leverage existing low data rate fire alarm system networks while still having the high speed data connections it requires for some of its functions.

In general, according to another aspect, the invention features a method for detecting gunshots within a premises. Gunshot sensor units, which detect gunshots, receive power from a fire alarm communication network of a fire alarm system for the premises via tap units, which provide electrical connectivity between the gunshot sensor units and the fire alarm communication network.

In general, according to another aspect, the invention features a system for detecting gunshots within a premises that includes a fire alarm system with a control panel. Gunshot sensor units, which detect gunshots, include controllers configured to generate event data based on the detected gunshots and network interfaces allowing the gunshot sensor units to send the event data to the control panel of the fire alarm system.

In general, according to another aspect, the invention features a method for detecting gunshots within a premises. Gunshot sensor units detect gunshots and generate event data based on the detected gunshots. The event data is sent to a control panel of a fire alarm system for the premises via network interfaces of the gunshot sensor units.

In general, according to another aspect, the invention features a fire alarm and gunshot detection system. Included are gunshot sensor units for detecting gunshots and a control panel. The gunshot sensor units include controllers for generating gunshot event data based on the detected gunshots. In addition to receiving the gunshot event data from the gunshot sensor units, the control panel receives fire alarm signals from fire detection devices, activates fire notification devices based on the fire alarm signals and generates gunshot alerts based on the gunshot event data.

In general, according to another aspect, the invention features a method of operation of a fire alarm and gunshot detection system. Gunshot sensor units detect gunshots and generate gunshot event data based on the detected gunshots. Fire alarm signals are received from fire detection devices. Fire notification devices are activated based on the fire alarm signals, and gunshot alerts are generated based on the gunshot event data.

In general, according to another aspect, the invention features a fire alarm and gunshot detection system. Included are gunshot sensor units for detecting gunshots and a control panel. The gunshot sensor units include fire detection elements for detecting fire and controllers for generating gunshot event data based on the detected gunshots and fire alarm signals based on the detected fire. The control panel receives the gunshot event data and the fire alarm signals from the gunshot sensor units.

In general, according to another aspect, the invention features a method of operation of a fire alarm and gunshot detection system. Gunshot sensor units detect gunshots and generate gunshot event data based on the detected gunshots. The gunshot sensor units also detect indications of fire via fire detection elements and generate fire alarm signals based on the detected indications of fire. The gunshot event data and the fire alarm signals are received by a control panel.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
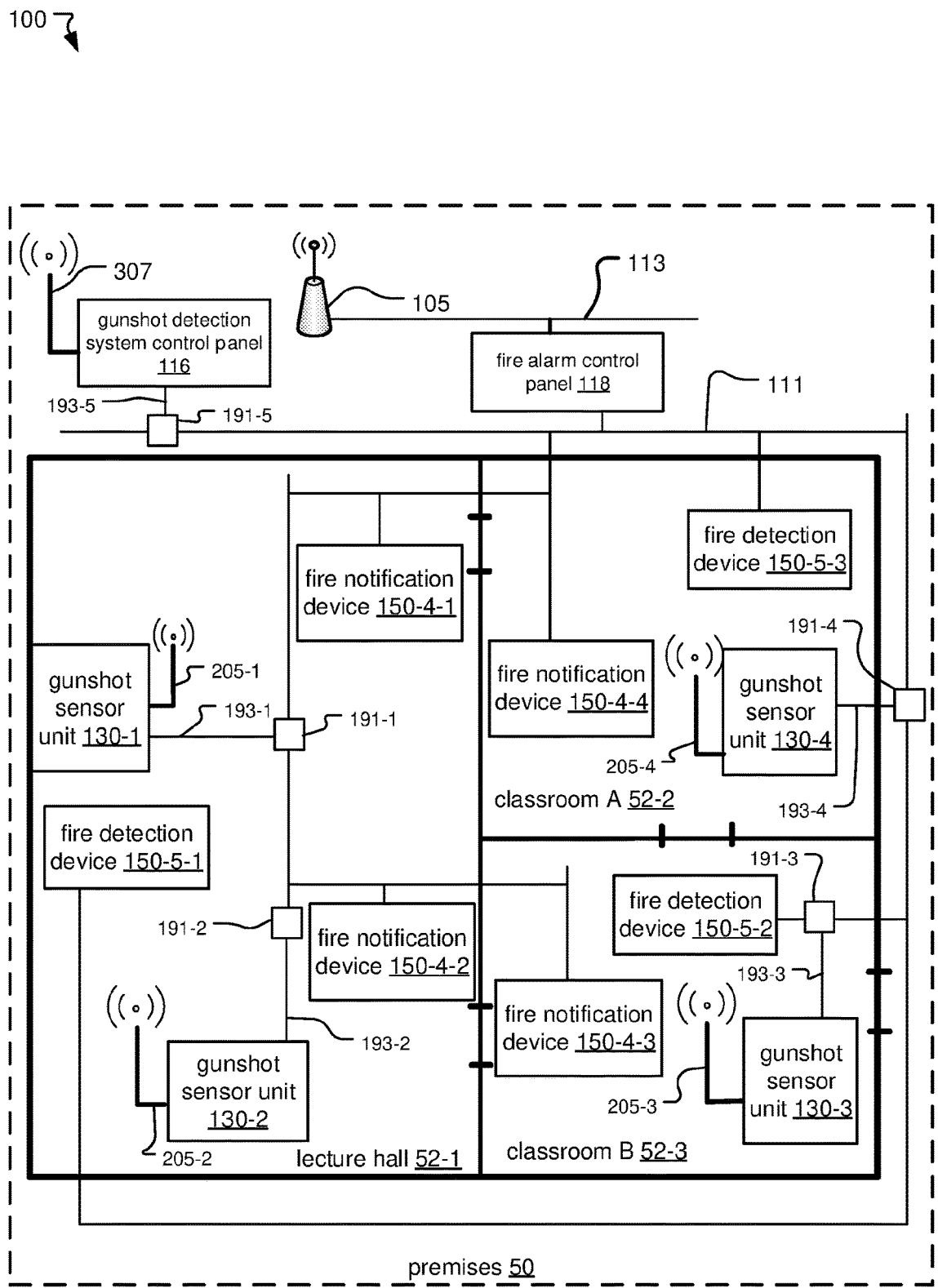
FIG. 1 is a schematic diagram of an exemplary gunshot detection system according to one embodiment of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building). In the illustrated example, the premises 50 is a simplified floor example of a building with three areas 52, a lecture hall 52-1, classroom A 52-2, and classroom B 52-3.

The premises 50 also includes one or more building management systems. Building management systems such as fire alarm systems, access control systems, and/or building automation systems, typically include control panels 118 and various distributed devices 150. In general, the control panels 118 direct the functionality of the building management systems by receiving signals and/or data (for example, from the distributed devices 150), sending instructions, and determining and sending status information or sensor data, among other examples, to be displayed on or utilized by the distributed devices 150. The distributed devices 150 are positioned throughout the premises 50, for example, in areas 52 of the premises such as rooms, hallways, lobbies or stairways, to name a few examples, and perform the management and/or automation functions of the building management system. The control panels 118 and the distributed devices 150 of building management systems typically communicate via a communication network 111, which supports digital and/or analog communication between the distributed devices 150 and the control panel 118.

More specifically, in the illustrated example, among the building management systems installed at the premises 50 is a fire alarm system, which monitors for conditions of the premises 50 indicative of fire and alert occupants of the premises 50. The fire alarm system includes a fire alarm control panel 118, which is connected via a fire alarm communication network 111 to the fire alarm distributed devices 150, including fire detection devices 150-5 and fire notification devices 150-4. The fire detection devices 150-5 are alarm initiation devices and include smoke detectors and manually activated devices such as call points and pull stations, carbon monoxide detectors and heat detectors, to list a few examples. The fire detection devices 150-5 monitor the buildings for indicators of fire. Upon detection of indicators of fire, device signals are sent from the fire detection devices 150-5 to the fire alarm control panel 118.

The fire notification devices 150-4, which notify occupants of the premises 50 of a potential fire and generally include sounders, which might include speakers, horns, bells, and/or chimes, and flashing lights (e.g., strobes), light emitting diode (LED) reader boards, to list a few examples. In response to detection of indicators of fire, the fire alarm control panel 118 initiates an alarm state, which activates the fire notification devices 150-4, for example, by sending instructions to the fire notification devices 150-4.

The fire alarm communication network 111 is principally a two- or four-wire addressable serial network with one or more signaling line circuits enabling digital communication between the fire alarm control panel 118 and the fire alarm devices 150-4, 150-5. In addition, the fire alarm communication network 111 also provides power to the devices 150-4, 150-5 with direct current (DC) superimposed upon the data that is transmitted between the devices and other nodes on the network. In general, the fire alarm communication network 111 might be capable of transmission rates as high as 10 megabits per second (Mbps) but is commonly characterized by transmission rates of 1 Mbps or less in practice.

In the illustrated example, two fire notification devices 150-4-1, 150-4-2 and one fire detection device 150-5-1 are located in the lecture hall 52-1, while one fire notification device 150-4-4 and one fire detection device 150-5-3 are located in classroom A 52-2, and one fire notification device 150-4-3 and one fire detection device 150-5-2 are located in classroom B 52-3.

Similar to the fire alarm system, the gunshot detection system 100 includes gunshot sensor units 130 and a gunshot detection control panel 116. In general, and in one configuration, the gunshot sensor units 130 detect conditions indicative of the gunshots or other emergencies and alert the gunshot detection control panel 116, which takes one or more responsive actions such as alerting building personnel, law enforcement, and/or a monitoring center, or collecting and presenting data pertaining to the detected gunshots to an operator of the control panel 116.

More specifically, the gunshot sensor units 130 are distributed throughout the premises 50. In the illustrated example, two gunshot sensor units 130-1, 130-2 are located in the lecture hall 52-1, while one gunshot sensor unit 130-4 is located in classroom A 52-2, and one gunshot sensor unit 130-3 is located in classroom B 52-3.

The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes audio data (e.g. digitized audio clips) depicting the acoustic anomalies, metadata including, for example, time information indicating when the acoustic anomalies started and/or stopped, duration information for the acoustic anomalies and/or the audio data depicting the acoustic anomalies, file information, and identification information for the gunshot sensor unit 130, and sensor data generated by the gunshot sensor unit 130. The event data can be locally stored, collected by the control panel 116, transferred to remote servers, and/or transferred to devices of law enforcement entities for forensic analysis, for example.

On the other hand, the gunshot detection system control panel 116 directs the overall functionality of the gunshot detection system 100 by sending instructions (e.g. control messages) to be executed by the gunshot sensor units 130, receiving the event data (including the audio data) from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. The gunshot detection system control panel 116 also presents information to an operator of the control panel 116 and receives selections, for example, via a user interface, the selections indicating configuration settings and/or actions to be performed by the control panel 116 with respect to the gunshot sensor units 130.

The devices of the gunshot detection system 100, including the gunshot sensor units 130 and the control panel 116, receive power from the fire alarm communication network 111. Specifically, tap units 191 of the gunshot detection system 100 provide electrical connectivity between the fire alarm communication network 111 and the gunshot detection devices 130, 116, enabling the devices to draw power from the fire alarm communication network 111 based on the D.C. or AC voltage across conductors of wiring of the fire alarm communication network 111. The gunshot detection devices 130, 116 might draw their full operating power or a portion of their operating power from the fire alarm communication network 111. In the latter example, the devices typically draw all power in a passive mode from the fire alarm communication network 111 but then draw additional power in an active mode from another internal and/or external source such as a power circuit or batteries, among other examples. In one embodiment, the tap unit 191 might form one or two T-splices, using a tap wire splice connector to connect the end of one or two tap wires 193 to the middle of another one or two main wires (e.g. of the fire alarm communication network 111).

At the same time, the gunshot sensor units 130 and the gunshot detection control panel 116 communicate over a wired and/or wireless enterprise network 113, which might include an internet-protocol (IP)-based private network built for a specific enterprise client, a local area network (LAN) for the premises 50, a leased data connection, and/or a public network such as the internet, in examples. The gunshot sensor units 130 and control panel 116 connect to the enterprise network 113 via wireless communication links between wireless network interfaces and antennas 205, 307 of the devices 130, 116 and one or more wireless access points 105, which, in general, provide connectivity between the devices 130, 116 and the enterprise network 113. The wireless access point 105 might be, for example, a wireless router with a wired connection to the enterprise network 113. The devices 130, 116 might also connect to the enterprise network 113 via wireless communication links to a cellular radio tower of a mobile broadband or cellular network or public and/or private wired data networks such as an enterprise network, Wi-Max, or Wi-Fi network, for example. The enterprise network 113 is characterized by transmission rates of between 6 and 54 Mbps for wireless links and 10 Mbps or more for wired links (e.g. Ethernet), with some networks supporting rates as high as 100 Mbps or more.

In other cases, the gunshot sensor units 130 and the gunshot detection control panel 116 communicate over a wired enterprise network 113. The gunshot sensor units 130 and control panel 116 connect to the enterprise network 113 via wired communication links between wired network interfaces of the devices 130 and the control panel 116. The wired enterprise network 113 is characterized by transmission rates of 10 Mbps or more for wired links (e.g. Ethernet), with some networks supporting rates as high as 100 Mbps or more.

In one embodiment, the gunshot sensor units 130 only receive power from the fire alarm communication network 111 and otherwise use the enterprise network 113 to communicate with other devices such as the gunshot detection control panel 116.

In another embodiment, the gunshot sensor units 130 might send and receive limited information to and from the gunshot detection control panel 116 and/or the fire alarm control panel 118 via the fire alarm communication network 111 while using the enterprise network 113 as an ancillary high-speed network for transmitting more voluminous data such as large audio data files. The limited information sent via the fire alarm communication network 111 might include event data such as indications of detected gunshots and/or time information for the detected gunshots, time synchronization information from either of the control panels 116, 118, and/or instructions from the control panels 116, among other examples.

Figure 2:
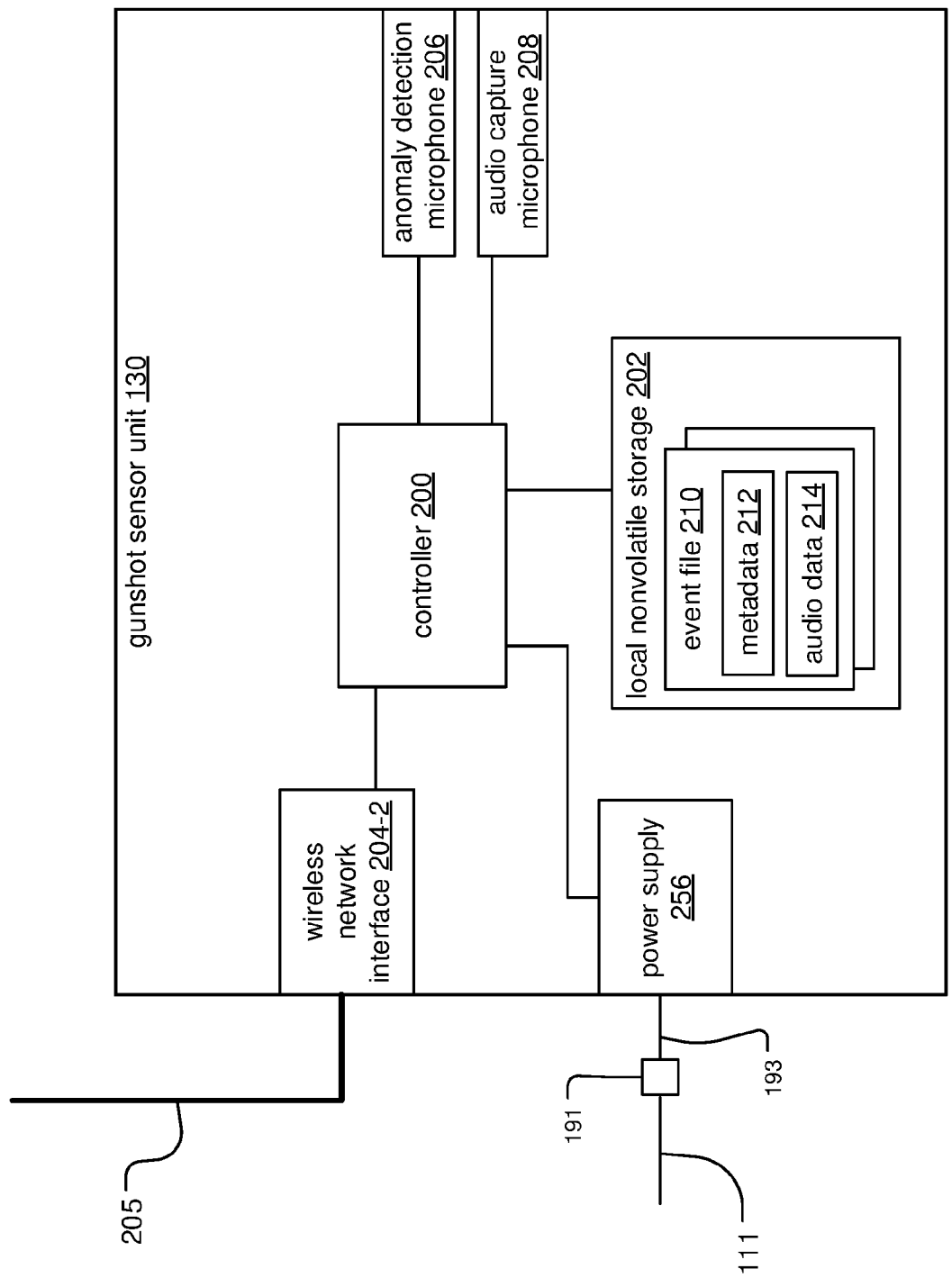
FIG. 2 is a block diagram of a gunshot sensor unit of the gunshot detection system.

FIG. 2 is a block diagram showing an exemplary gunshot sensor unit 130.

The gunshot sensor unit 130 includes a controller 200, local nonvolatile storage 202, a wireless or wired network interface 204-2, an anomaly detection microphone 206, an audio capture microphone 208, and a power supply 256 with a wired interface to the fire alarm communications network.

The controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

The wireless or wired network interface 204-2 provides connectivity with the gunshot detection control panel 116 and possibly other devices via a wireless link to the enterprise network 113 via the antenna 205 or a standard wired interface such as an RJ-45. The wireless network interface 204-2 implements IEEE 802.11 standards, in one embodiment. It can use the 2.4 gigahertz UHF or 5.8 gigahertz SHF ISM radio bands.

The power supply 256 supplies electric power to components of the gunshots sensor unit 130 by receiving power from the fire alarm communication network 111. More specifically, the power supply 256 receives incoming electric current from a conductor of the fire alarm communication network (e.g. superimposed upon the transmitted data) via the tap unit 191 and the tap wire 193 and converts the electric current to a predetermined voltage, current and frequency to be consumed by the gunshot sensor unit 130.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or data information for the events. In embodiments, the local nonvolatile storage 202 could be fixed storage such as flash memory, or removable storage such as an SD card, among other examples.

Figure 3:
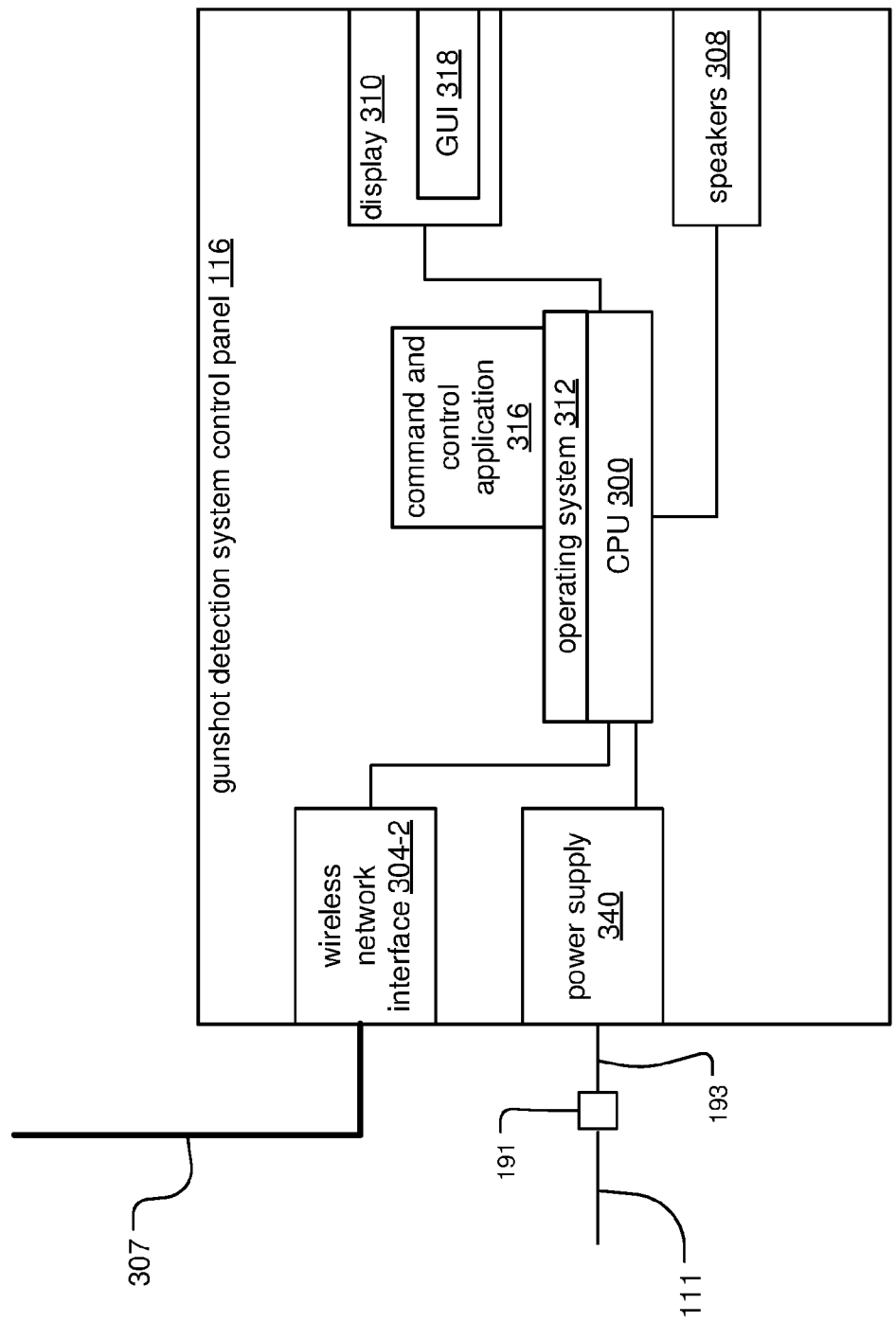
FIG. 3 is a block diagram of a control panel of the gunshot detection system.

FIG. 3 is a block diagram showing an exemplary control panel 116.

The control panel 116 includes a central processing unit (CPU) 300, a wireless network interface 304-2, a display 310, speakers 308, and a power supply 340.

Similar to analogous components on the gunshot sensor units 130, the wireless network interface 304-2 provides connectivity with the gunshot sensor units 130 and possibly other devices via a wireless link to the enterprise network 113 via the antenna 307.

The power supply 340 supplies electric power to components of the gunshot detection control panel 116 by receiving power from the fire alarm communication network 111. As with the power supply 256 of the gunshot sensor unit 130, the power supply 340 receives incoming electric current from a conductor of the fire alarm communication network 111 (e.g. superimposed upon the transmitted data) via the tap unit 191 and the tap wire 193 and converts the electric current to a predetermined voltage, current and frequency to be consumed by the control panel 116.

The speakers 308 provide audio playback of audio data from the gunshot sensor units 130. The audio data can be the locally stored audio data 214 depicting the acoustic anomalies or can be captured and streamed live for live monitoring of the ambient sound in the area 52 where the gunshot sensor unit 130 is located.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The command and control application 316, in general, generates a graphical user interface (GUI) 318 that is rendered on the display 310 (e.g. touchscreen display) of the control panel 116. The GUI 318 presents gunshot sensor unit information to the operator and receives input indicating selections of various options for controlling the gunshot sensor units 130 such as retrieving locally stored event data and/or audio data or entering configuration settings for the gunshot detection system 100. Based on the received input, the command and control application 316 generates instructions (e.g. control messages) to be executed by the gunshot sensor units 130, for example.

Figure 4:
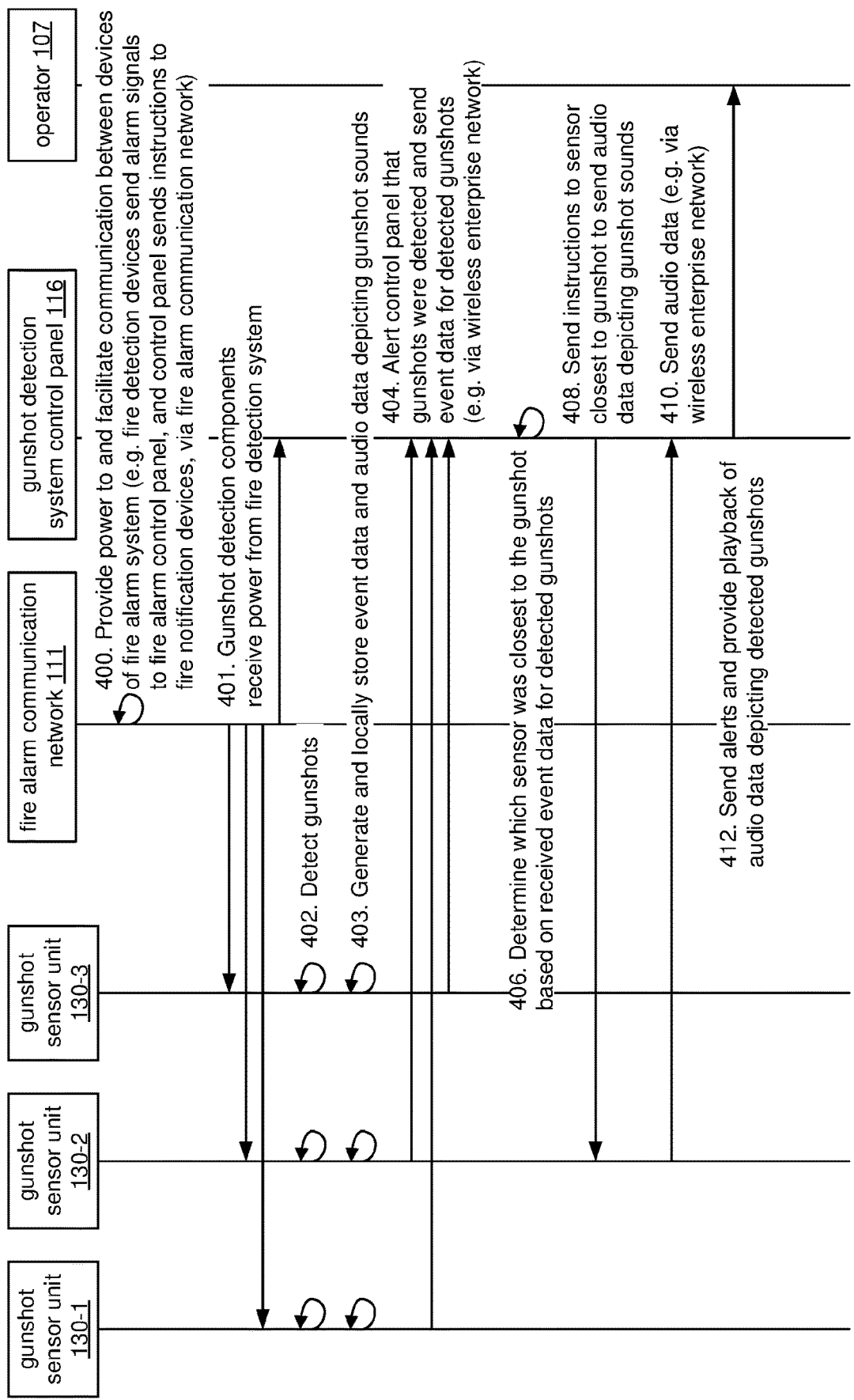
FIG. 4 is a sequence diagram illustrating a process by which devices of the gunshot detection system are powered by a fire alarm communication network of a fire alarm system.

FIG. 4 is a sequence diagram illustrating a process by which devices of the gunshot detection system 100 are powered by the fire alarm communication network 111.

First, in step 400, during normal operation, the fire alarm communication network 111 provides power from the fire alarm control panel 118 to the distributed devices 150 of the fire alarm system in the form of DC superimposed upon transmitted data exchanged over the communication network 111. The fire alarm communication network 111 also facilitates communication between the fire alarm control panel 118 and the distributed devices 150. For example, the fire detection devices 150-5 send alarm signals to the fire alarm control panel 118 via the fire alarm communication network 111, and/or the control panel 118 sends instructions to the fire notification devices 150-4 via the communication network 111.

At the same time, in step 401, the gunshot sensor units 130 and the gunshot detection control panel 116 also receive power from the fire alarm communication network 111.

Then, in step 402, one or more of the gunshot sensor units 130 detect gunshots. The gunshot sensor units 130 detect acoustic anomalies indicative of the gunshot via the anomaly detection microphones 206, for example, by searching the incoming acoustic signal from the anomaly detection microphone 206 for a peak amplitude level large enough to be identified as a gunshot.

In step 403, the gunshot sensor units 130 generate event data, for example, by recording timestamps for the detected shots and audio data via the audio capture microphone 208. The gunshot sensor units 130 alert the gunshot detection control panel 116 that gunshots were detected and send the event data to the control panel 116 in step 404. In one embodiment, the gunshot sensor units 130 might alert the control panel 116 and/or send the event data via the enterprise network 113. However, in another embodiment, the gunshot sensor units 130 might instead alert one or both of the gunshot detection control panel 116 and the fire alarm control panel 118 via the fire alarm communication network 111.

In step 406, the control panel 116 performs a de-confliction process and determines which gunshot sensor unit 130 was closest to the source of the acoustic anomaly based on the received event data. This process involves determining which event data received from the gunshot sensor units 130 pertain to the same acoustic anomalies and then determining which of the gunshot sensor units 130 detected each of the acoustic anomalies first (e.g. based on the metadata indicating the timing information for the gunshots).

In step 408, the control panel 116 sends instructions to the gunshot sensor unit 130-2 that was determined to be closest to the gunshots to send its full event data, including a full captured audio data sample depicting the gunshots and any ambient sound before and/or after the gunshots. In response, the gunshot sensor unit 130-2 sends the full event data including the full audio data sample to the control panel 116 via the enterprise network 113 in step 410.

In step 412, the control panel 116 alerts the operator 107 of the gunshots and provides audio playback of the audio data depicting the gunshots via the speakers 308. The control panel 116 might also take other responsive actions such as storing the event data in a database and/or nonvolatile memory of the control panel 116.

Figure 5:
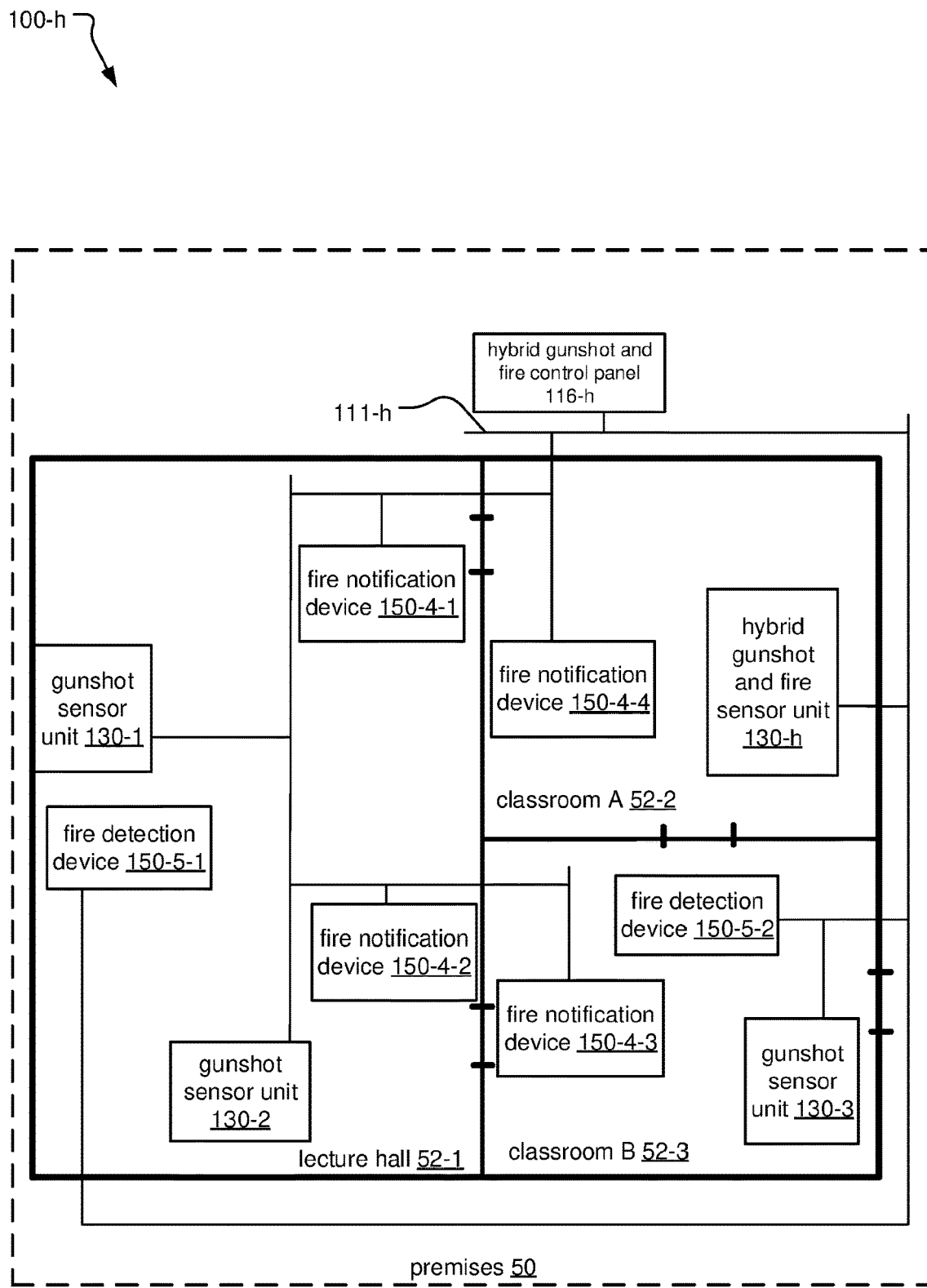
FIG. 5 is a schematic diagram of an exemplary gunshot detection system according to another embodiment of the invention in which the gunshot detection system and fire alarm systems are combined into a hybrid gunshot detection and fire alarm system.

FIG. 5 is a schematic diagram of an exemplary hybrid gunshot detection and fire alarm system 100 according to another embodiment of the invention.

The system is similar to that depicted in FIG. 1. Now, however, the gunshot detection system and fire alarm systems are combined into a hybrid gunshot detection and fire alarm system 100-h operating on a common communication network 111-h, controlled by a hybrid gunshot and fire control panel 116-h.

The gunshot and fire control panel 116-h directs the functionality of the hybrid gunshot and fire system 100-h by performing the functions of both the gunshot detection control panel 116 and the fire alarm control panel 118, including receiving gunshot event data from the gunshot sensor units 130, receiving alarm signals from the fire detection devices 150-5, and/or activating the fire notification devices 150-4, among other examples.

The common communication network 111-h, in general, is a wired and/or wireless network that supports analog and/or digital communication between the devices of the hybrid gunshot detection system 100-h. In this embodiment, the common communication network 111-h might be an addressable serial network such as the fire alarm communication network 111, an enterprise network 113, and/or include elements of both types of network.

In addition to the previously described gunshot sensor units 130, fire notification devices 150-4, and fire detection devices 150-5, the hybrid system 100-h includes a hybrid gunshot and fire sensor unit 130-h, which detects gunshots and detects indications of fire within the premises 50. In the illustrated example, the hybrid gunshot and fire sensor unit 130-h is located in classroom A 52-2.

Figure 6:
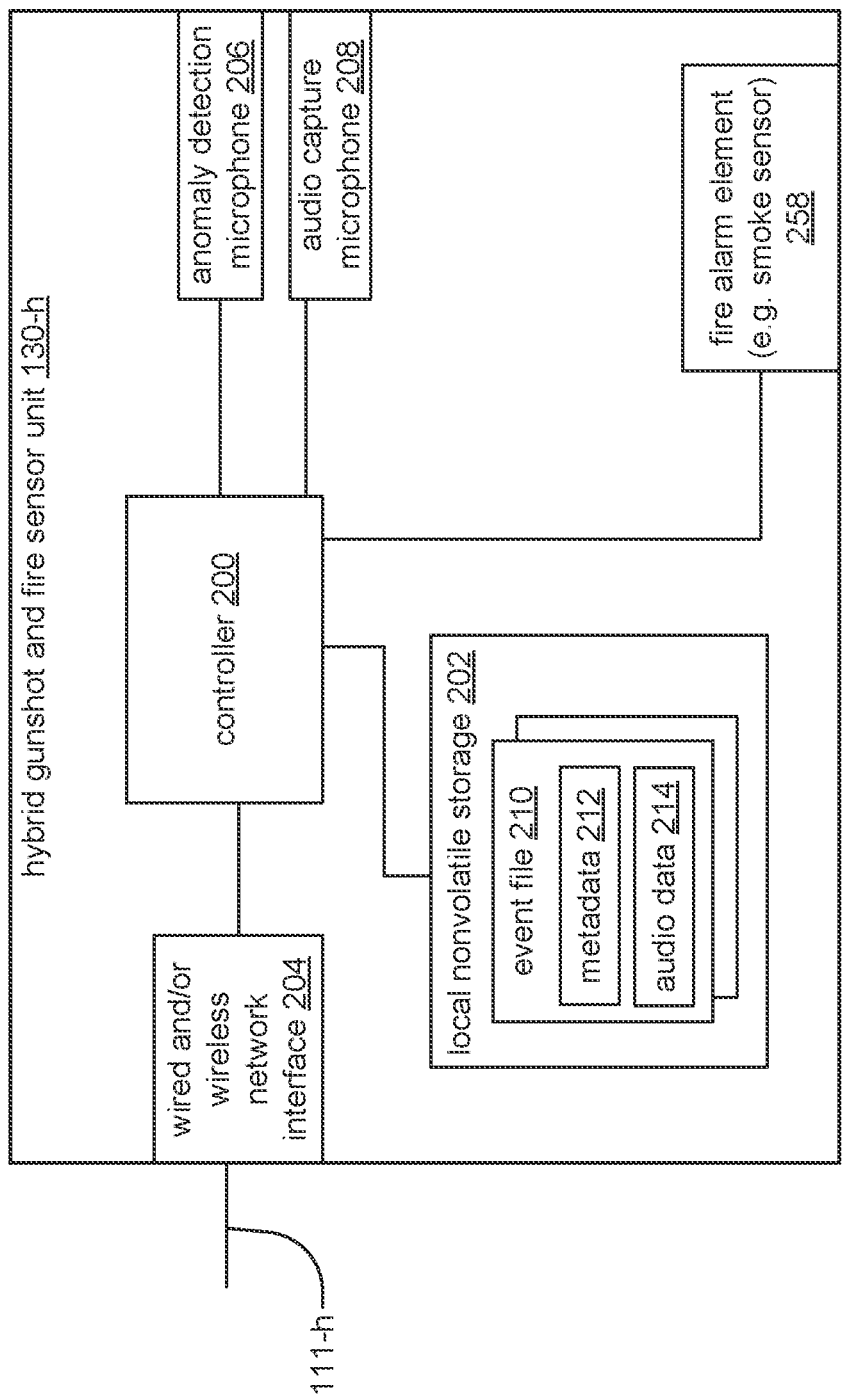
FIG. 6 is a block diagram of a hybrid gunshot and fire sensor unit of the hybrid gunshot detection and fire alarm system.

FIG. 6 is a block diagram showing an exemplary hybrid gunshot and fire sensor unit 130-h.

The hybrid sensor unit 130-h is similar to the gunshot sensor unit 130 described with respect to FIG. 2. Now, however, the gunshot sensor unit 130 includes a wired and/or wireless network interface and a fire alarm element 258.

The wired and/or wireless network interface 204 provides connectivity with the hybrid control panel 116-h and possibly other devices via the common communication network 111-h. In addition, the network 111-h might also provide power to the devices, with DC superimposed upon the data that is transmitted between the devices and other nodes on the network 111-h.

In general, the fire alarm element 258 performs one or more functions of the distributed devices 150 of the fire alarm system. The fire alarm element 258 could be a sensor for detecting indications of fire, a user interface mechanism like a button, switch or lever such as those found in pull stations, or alarm indicators such as sounders, which might include speakers, horns, bells, and/or chimes, and flashing lights (e.g., strobes), and light emitting diode (LED) reader boards, among other examples.

The controller 200 of the hybrid gunshot sensor unit 130-h is configured to perform fire alarm functionality in addition to the previously described gunshot detection functionality of the gunshot sensor unit 130. For example, the controller 200 might generate fire alarm signals and/or fire alarm event data based on indications of fire detected by the fire alarm element 258 (e.g. a smoke or fire sensor) and send the fire alarm signals and/or event data to the hybrid control panel 116. In another example, the controller 200 activates the fire alarm element (e.g. sounder) in response to instructions from the hybrid control panel 116-h.

Figure 7:
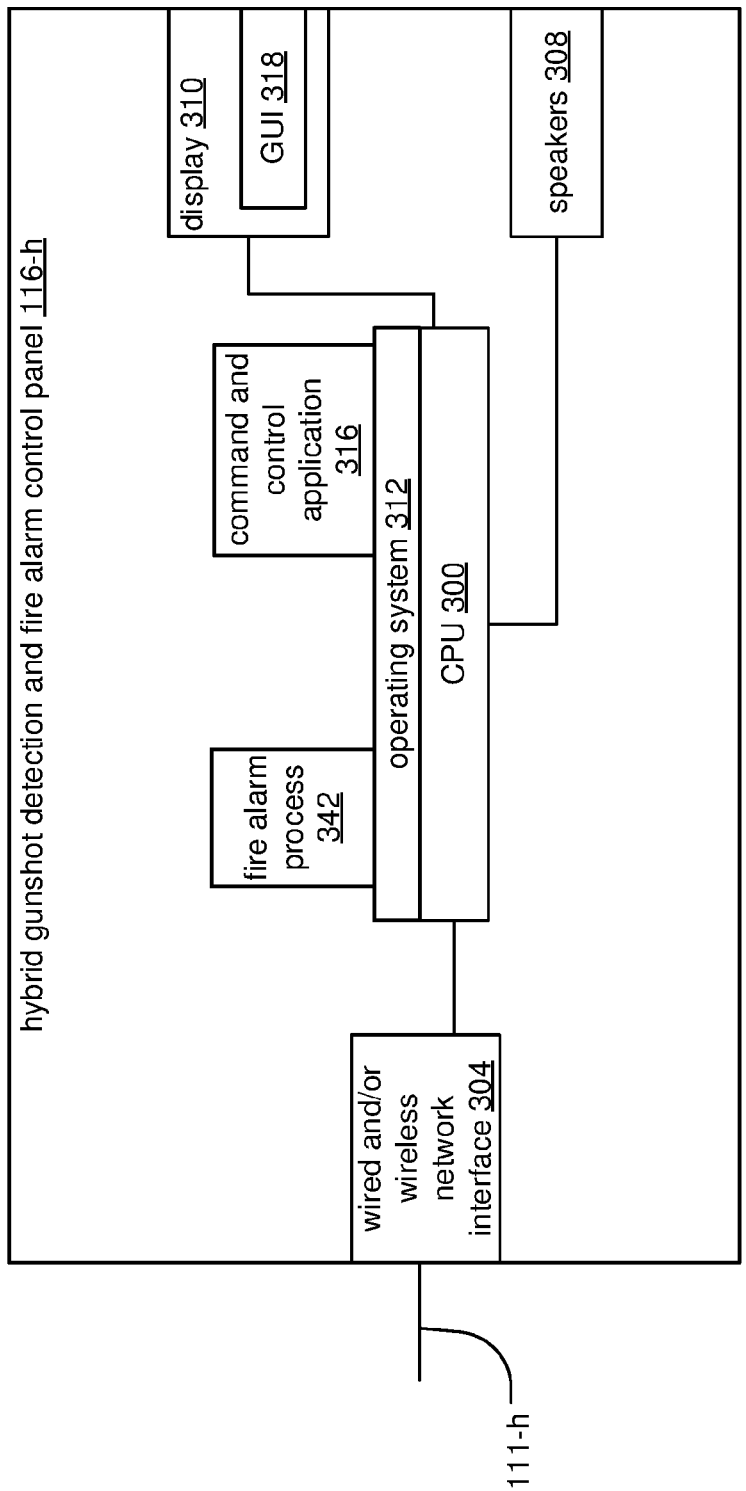
FIG. 7 is a block diagram of a hybrid gunshot detection and fire alarm control panel of the hybrid gunshot detection and fire alarm system.

FIG. 7 is a block diagram showing an exemplary hybrid gunshot detection and fire alarm control panel 116-h.

The hybrid control panel 116-h is similar to the gunshot detection control panel 116 described with respect to FIG. 3. Now, however, the hybrid control panel 116-h includes a wired and/or wireless network interface 304, and a fire alarm process 342 is executing on the CPU 300.

Similar to analogous components on the hybrid gunshot sensor units 130-h, the wired and/or wireless network interface 304 provides connectivity with the gunshot sensor units 130, 130-h, fire alarm distributed devices 150-4, 150-5, and possibly other devices via the common communication network 111-h. In some examples, the control panel 116-h may also supply power to these devices 130, 130-h, 150-4, 150-5.

The fire alarm process 342 performs fire alarm functionality such as that described with respect to the fire alarm control panel 118. For example, the fire alarm process 342 receives fire alarm signals and/or event data from the fire detection devices 150-4 and/or the hybrid gunshot sensor units 130-h and generates and sends instructions based on the fire alarm signals to the fire notification devices 150-4 and/or hybrid gunshot and fire sensor units 130-h to activate alarm indicators to alert occupants of the premises 50 of potential fire.

Figure 8:
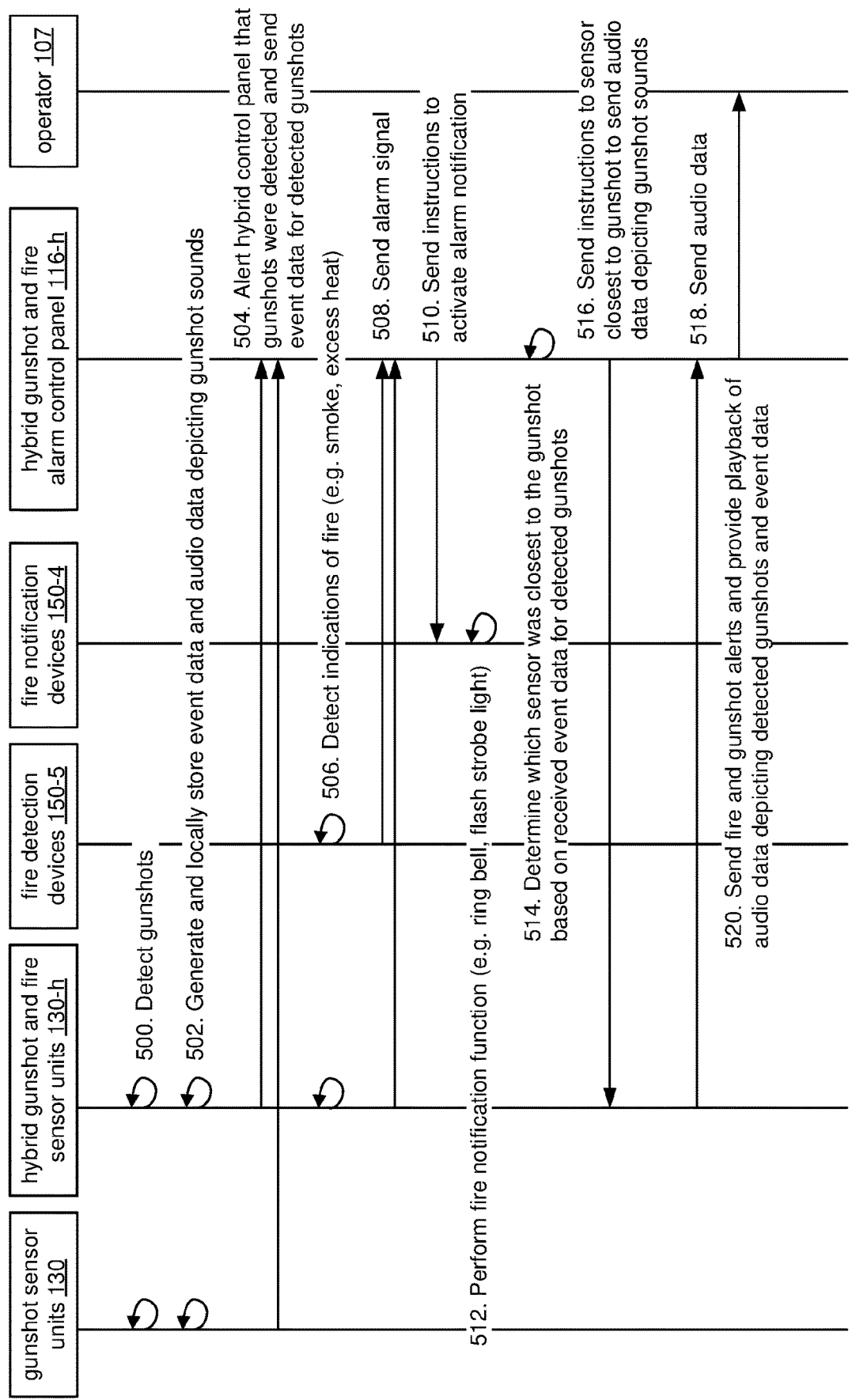
FIG. 8 is a sequence diagram illustrating a process by which the hybrid gunshot detection and fire alarm system both detects gunshots and monitors for indications of fire.

FIG. 8 is a sequence diagram illustrating a process by which the hybrid gunshot and fire system 100-h both detects gunshots within the premises 50 and monitors the premises 50 for indications of fire.

First, in step 500, one or more of the gunshot sensor units 130 and/or the hybrid gunshot and fire sensor units 130-h detect gunshots. For example, the units 130, 130-h detect acoustic anomalies indicative of the gunshot via the anomaly detection microphones 206, for example, by searching the incoming acoustic signal from the anomaly detection microphone 206 for a peak amplitude level large enough to be identified as a gunshot.

In step 502, the gunshot sensor units 130 and hybrid sensor units 130-h generate gunshot event data, for example, by recording timestamps for the detected shots and audio data via the audio capture microphone 208. The units 130, 130-h alert the hybrid gunshot detection and fire alarm control panel 116-h that gunshots were detected and send the event data to the control panel 116 in step 504.

In step 506, the fire detection devices 150-5 and/or the hybrid gunshot and fire sensor units 130-h (e.g. via the fire alarm element 258) detect indications of fire such as smoke and/or excessive heat above a predetermined threshold.

In step 508, the fire detection devices 150-5 and hybrid sensor units 130-h send alarm signals to the hybrid control panel 116-h.

In response, in step 510, the hybrid control panel 116-h generates and sends instructions to activate the fire notification devices 150-4, and in step 512, the fire notification devices 150-4 perform their respective fire notification functions such as emitting sound via a sounder such as a bell, or flashing light via a strobe light.

In step 514, the hybrid control panel 116-h also performs the de-confliction process, determining which gunshot sensor unit 130, 130-h was closest to the source of the acoustic anomaly based on the received gunshot event data.

In step 516, the hybrid control panel 116-h sends instructions to the gunshot sensor unit 130 that was determined to be closest to the gunshots to send its full event data, including a full captured audio data sample depicting the gunshots and any ambient sound before and/or after the gunshots. In the illustrated example, the hybrid control panel 116-h sends the instructions to the hybrid gunshot and fire sensor unit 130-h.

In response, in step 518, the hybrid sensor unit 130-h sends the full event data including the full audio data sample to the hybrid control panel 116-h.

In step 520, the hybrid control panel 116 alerts the operator 107 of the detected fire and/or gunshots and provides audio playback of the audio data depicting the gunshots via the speakers 308.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots within a premises, the system comprising:
   gunshot sensor units for detecting gunshots and receiving power from a fire alarm communication network of a fire alarm system for the premises; and
   tap units for providing electrical connectivity between the fire alarm communication network and the gunshot sensor units;
   wherein each of the tap units forms one or more T-splices and wherein each of the tap units uses a tap wire splice connector to connect an end of one or more tap wires to a middle of one or more main wires of the fire alarm communication network.

2. The system as claimed in claim 1, further comprising a gunshot detection control panel for receiving event data from the gunshot sensor units via a wired and/or wireless enterprise network, wherein the gunshot sensor units generate the event data based on the detected gunshots.

3. The system as claimed in claim 2, wherein the enterprise network is an internet-protocol-based private network, local area network for the premises and/or public network providing data transmission rates of at least 10 megabits per second.

4. The system as claimed in claim 2, wherein the gunshot sensor units comprise microphones for generating audio data, and the event data generated by the gunshot sensor units includes the audio data.

5. The system as claimed in claim 2, wherein the gunshot sensor units comprise wireless network interfaces for connecting to the enterprise network.

6. The system as claimed in claim 2, wherein the gunshot detection control panel comprises a wireless network interface for connecting to the enterprise network.

7. The system as claimed in claim 2, wherein the gunshot detection control panel comprises a power supply for receiving power from the fire alarm communication network via one of the tap units.

8. The system as claimed in claim 1, wherein the fire alarm communication network is an addressable serial network comprising one or more signaling line circuits providing transmission rates of at most 10 megabits per second.

9. The system as claimed in claim 1, wherein fire detection devices of the fire alarm system detect indications of fire within the premises and send alarm signals to a fire alarm control panel of the fire alarm system via the fire alarm communication network based on the detected indications of fire.

10. The system as claimed in claim 9, wherein the fire alarm control panel sends instructions to fire notification devices of the fire alarm system via the fire alarm communication network based on the alarm signals.

11. The system of claim 1, wherein the tap units enable the gunshot sensor units to draw power from the fire alarm communication network by providing the electrical connectivity between the fire alarm communication network and the gunshot sensor units.

12. A system for detecting gunshots within a premises, the system comprising:
  gunshot sensor units for detecting gunshots and receiving power from a fire alarm communication network of a fire alarm system for the premises;
  tap units for providing electrical connectivity between the fire alarm communication network and the gunshot sensor units; and
  a gunshot detection control panel for receiving event data from the gunshot sensor units via a wired and/or wireless enterprise network, wherein the gunshot sensor units generate the event data based on the detected gunshots;
  wherein the gunshot sensor units only receive power from the fire alarm communication network and use only the enterprise network to communicate with the gunshot detection control panel.

13. A system for detecting gunshots within a premises, the system comprising:
  gunshot sensor units for detecting gunshots and receiving power from a fire alarm communication network of a fire alarm system for the premises;
  tap units for providing electrical connectivity between the fire alarm communication network and the gunshot sensor units; and
  a gunshot detection control panel for receiving event data from the gunshot sensor units via a wired and/or wireless enterprise network, wherein the gunshot sensor units generate the event data based on the detected gunshots;
  wherein the gunshot sensor units send and receive limited information to and from the gunshot detection control panel via the fire alarm communication network while using the enterprise network as an ancillary high-speed network for transmitting audio data generated via microphones of the gunshot sensor units, the limited information including indications of detected gunshots and/or time information for the detected gunshots.

14. A system for detecting gunshots within a premises, the system comprising:
  gunshot sensor units for detecting gunshots and receiving power from a fire alarm communication network of a fire alarm system for the premises; and
  tap units for providing electrical connectivity between the fire alarm communication network and the gunshot sensor units; and
  wherein the gunshot sensor units draw all power in a passive mode from the fire alarm communication network but draw additional power in an active mode from another internal and/or external power source.

15. A system for detecting gunshots within a premises, the system comprising:
  gunshot sensor units for detecting gunshots and receiving power from a fire alarm communication network of a fire alarm system for the premises; and
  tap units for providing electrical connectivity between the fire alarm communication network and the gunshot sensor units;
  wherein the tap units enable the gunshot sensor units to draw power from the fire alarm communication network by providing the electrical connectivity between the fire alarm communication network and the gunshot sensor units; and
  wherein power supplies of the gunshot sensor units receive incoming electric current from a conductor of the fire alarm communication network via the tap units and convert the received electric current to a predetermined voltage, current, and frequency to be consumed by the gunshot sensor unit.

* * * * *